United States Patent [19]

Fisher

[11] 4,275,122
[45] Jun. 23, 1981

[54] SHAFT AND UNIVERSAL JOINT MEMBER ASSEMBLY

[75] Inventor: Leslie G. Fisher, Birmingham, England

[73] Assignee: GKN Transmissions Limited, England

[21] Appl. No.: 57,486

[22] Filed: Jul. 13, 1979

[30] Foreign Application Priority Data

Jul. 17, 1978 [GB] United Kingdom ............... 30067/78

[51] Int. Cl.³ .............................................. F16D 1/06
[52] U.S. Cl. .................................... 428/542; 403/265
[58] Field of Search .......................... 428/542, 36, 188; 156/169, 172, 173, 175, 184, 185, 187; 403/265, 267, 361

[56] References Cited

U.S. PATENT DOCUMENTS

| 1,317,146 | 9/1919 | Welles | 156/185 X |
|---|---|---|---|
| 2,265,109 | 12/1941 | Birkhofer | 403/265 |
| 3,023,135 | 2/1962 | Wiltshire | 156/175 X |
| 3,115,988 | 12/1963 | Warnken | 156/173 X |
| 3,661,670 | 5/1972 | Pierpont, Jr. | 156/172 |
| 3,850,722 | 11/1974 | Kreft | 156/172 |
| 3,881,973 | 5/1975 | Pinckney | 156/172 X |
| 3,953,641 | 4/1976 | Marquis | 428/295 X |
| 4,110,144 | 8/1978 | Buehler | 156/173 |

Primary Examiner—Henry F. Epstein
Attorney, Agent, or Firm—Merriam, Marshall & Bicknell

[57] ABSTRACT

An assembly of a universal joint member and a shaft having a plurality of superimposed layers of material and an adhesive bond between axially inter-fitting parts of the shaft and universal joint member, the adhesive bond being established with more than one of the layers of material of the shaft to overcome a tendency to disruption of the layers of the shaft on torque transmission. The axially inter-fitting parts may be of stopped or frusto-conical form to provide a joint surface which intersects several of the layers of the shaft.

5 Claims, 2 Drawing Figures

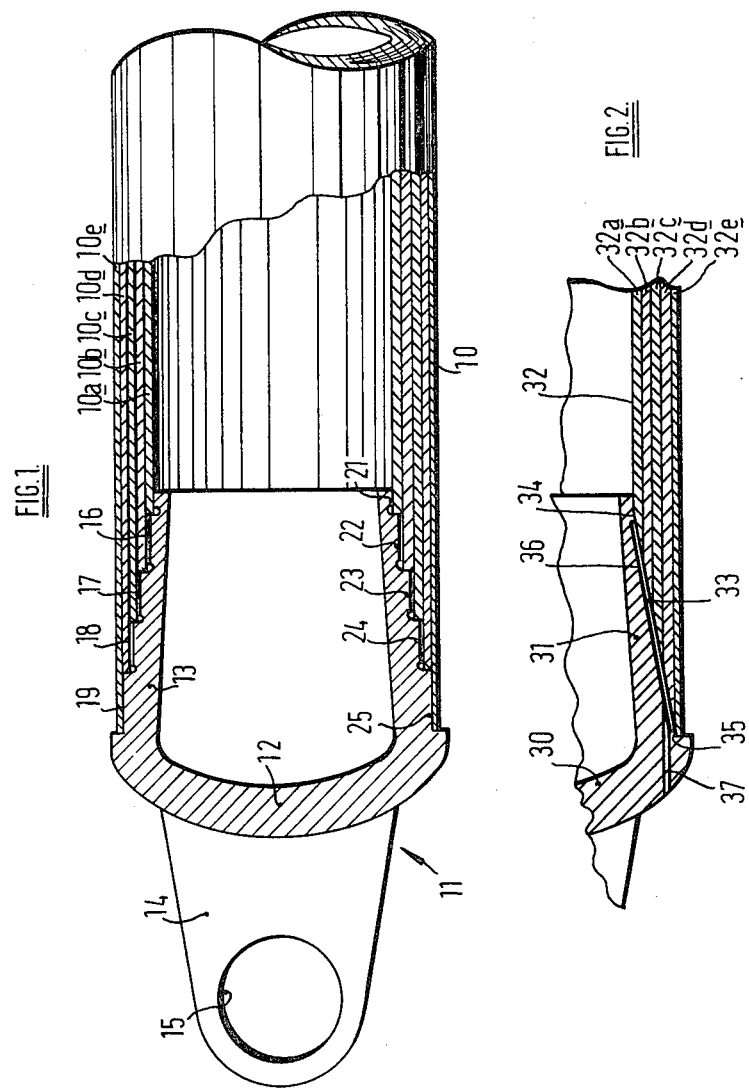

SHAFT AND UNIVERSAL JOINT MEMBER ASSEMBLY

BACKGROUND TO THE INVENTION

Field of the Invention

This invention relates to an assembly of a universal joint member and a shaft for torque transmission to or from the universal joint member, the shaft being of a construction which includes a plurality of radially superimposed annular layers of material, as distinct from being homogeneous, the shaft and universal joint member being secured together by an adhesive bond established between them.

The invention has been developed in relation to a shaft, for example a motor vehicle transmission shaft, which is of fibre reinforced synthetic resin material. Typically such a shaft may be made by applying a plurality of layers of fibres, e.g. glass and/or carbon fibres, to a mandrel, impregnating the fibres with the desired resin, and subjecting the assembly to treatment to cure the resin and form a solid matrix in which the fibres are set, the fibres usually being applied to the mandrel in layers of different helix angles in order to give the finished shaft the desired mechanical properties. It has been proposed hitherto to secure a universal joint member to such a shaft by inserting a spigot on the universal joint member into the shaft and introducing an adhesive substance which can subsequently be cured to establish the torque transmitting connection between the universal joint member and shaft. However, with such a construction a possible mode of failure of the assembly is that of disruption of the shaft structure between its different fibre layers in the region of the universal joint connection, and it is the object of the present invention to overcome or reduce this disadvantage.

SUMMARY OF THE INVENTION

According to the present invention, we provide an assembly of a universal joint member and a shaft having a plurality of radially superimposed annular layers of material, the universal joint member and shaft having axially inter-fitting parts and an adhesive bond being established between the joint member and shaft, the form of said axially inter-fitting parts being such as to provide for contact of an adhesive substance used in establishing said bond with a plurality of said layers of material of the shaft.

Thus, the present invention provides that because the adhesive bond is established with more than one of the layers of material of the shaft, disruption of the layers is rendered unlikely. Torque transmission between the layers, at least at the end of the shaft, is reduced or eliminated.

When the shaft is of fibre reinforced resin construction as described above, there may be layers of fibres which provide for torque transmission and other layers of fibres in different orientations which provide, for example, stiffness of the shaft to resist bending. In this case, the adhesive connection may provide a bond with only those layers of fibers which provide for torque transmission.

The axially inter-fitting parts of the joint member and shaft may be of stepped configuration so that the adhesive bond is established with the layers of the material of the shaft over a plurality of cylindrical areas at different radii. Alternatively, the inter-fitting parts may be tapered so that the adhesive bond is established over a frusto-conical surface which intersects the different layers of material of the shaft.

BRIEF DESCRIPTION OF DRAWINGS

The invention will now be described by way of example with reference to the accompanying drawings, of which FIG. 1 is a partly sectioned view of one embodiment of assembly according to the invention.

FIG. 2 shows a modification of the assembly.

DESCRIPTION OF PREFERRED EMBODIMENTS

The assembly of FIG. 1 comprises a tubular shaft 10 to which is secured a yoke member 11 of a Hookes type universal joint. The yoke member 11 comprises a base 12 with a spigot 13 which fits inside the end portion of the shaft 10, and two spaced lugs 14 provided with apertures 15 for receiving bearings and the cross member of the universal joint.

The shaft 10 is made of a fibre reinforced resin material, with layers 10a–10e of fibres disposed at respective different helix angles in order to provide the shaft with the desired properties of torque transmitting capacity and stiffness. Towards its end, the shaft is formed with a series of steps defining cylindrical surfaces 16, 17, 18, 19, of progressively increasing diameter. These surfaces thus expose different layers of the fibres of the shaft. The spigot 13 of the universal joint member is also formed with steps defining cylindrical surfaces 21, 22, 23, 24, 25, of which surface 21 fits closely within the interior surface of the shaft 10, surface 25 fits closely within surface 19 of the shaft, and surfaces 22, 23, 24 define small radial clearances between themselves and surfaces 16, 17, 18, respectively, of the shaft.

Prior to assembling the shaft and universal joint member, a film of suitable adhesive would be applied to the universal joint member and/or the shaft, and these components would then be placed together as illustrated so that a layer of the adhesive remains between the shaft and universal joint member in the clearances defined between the stepped surfaces thereof. The surfaces 21, 25 provide for accurate radial location and alignment of the yoke member 11 relative to the shaft. Upon subjecting the assembly to suitable treatment, e.g. heating, to cure the adhesive, a firm bond is established between the shaft and universal joint members. The adhesive contacts the shaft in different layers of the fibers thereof, thereby giving the effect previously referred to of reducing the tendency to disruption of the shaft between these layers.

In possible modifications, the end portion of the shaft and the spigot of the universal joint member may be of frusto-conical form, illustrated in FIG. 2, instead of being of stepped form to expose the layers of the shaft for adhesive bonding. In FIG. 2, there is shown part of a universal joint yoke member 30 with a spigot 31 extending within the end portion of a shaft 32 comprising layers 32a–32e of fibres at different helical winding angles. The shaft defines an internal frusto-conical surface 33, and the outer surface of the spigot affords portions 34, 35, which fit closely within the surface 33 of the shaft, and a portion 36 which leaves a clearance between the shaft and spigot for reception of adhesive.

Adhesive may be applied to the joint yoke member and/or the shaft prior to placing these components together, after which the assembly is subjected to treatment to cure the adhesive. Alternatively, there could be provided a passage 37 providing for injection of adhesive into the clearance defined between the shaft and joint member subsequent to assembly of these parts. In this latter case, a vent opening would also have to be provided to release air as the adhesive is introduced. A labyrinth for reception of adhesive could be provided, e.g. a groove of helical form or a plurality of inter-connected annular grooves.

Adhesives of the type which cure upon exclusion of air could also be utilised, in both the embodiments of FIG. 1 and FIG. 2.

In both the described embodiments, the universal joint member spigot fits inside the shaft, but it would also be within the scope of the invention for the tapered or stepped surfaces to be provided on the exterior of the shaft and interior of the universal joint member. Adhesive bonding need not necessarily be provided between all of the layers of the material of the shaft, especially if some of the layers contribute mainly to the bending stiffness of the shaft rather than the torque transmitting capability thereof. Further, it will be appreciated that although a Hookes type universal joint member has been described, the invention is applicable to the torque transmitting members of other types of universal joint and torque transmitting members for like purposes generally.

I claim:

1. An assembly of a universal joint member and a shaft, said shaft including a plurality of radially superimposed layers of fibre reinforced resin material, the joint member and shaft having axially inter-fitting parts and an adhesive bond being established between the joint member and shaft by inclusion of an adhesive substance therebetween, said axially inter-fitting parts of the joint member and shaft being of stepped configuration whereby said adhesive bond is established with a plurality of said layers of material of the shaft in generally cylindrical areas at different radii.

2. An assembly according to claim 1 wherein said layers of fibre reinforced resin material have fibres extending at different helix angles around the shaft.

3. An assembly of a universal joint member and a shaft, said shaft including a plurality of radially superimposed layers of fibre reinforced resin material, the joint member having a part which fits within an end portion of the shaft and which has an exterior surface of tapering configuration, said end portion of the shaft affording an interior surface which tapers from the end of the shaft, said part of the joint member intersecting a plurality of the layers of material of the shaft and an adhesive bond being established between said surfaces of the universal joint member and shaft.

4. An assembly according to claim 3 wherein said layers of fibre reinforced resin material have fibres extending at different helix angles around the shaft.

5. An assembly according to claim 3 wherein said tapering axially inter-fitting parts of the shaft and universal joint member are of frusto-conical form.

* * * * *